UNITED STATES PATENT OFFICE.

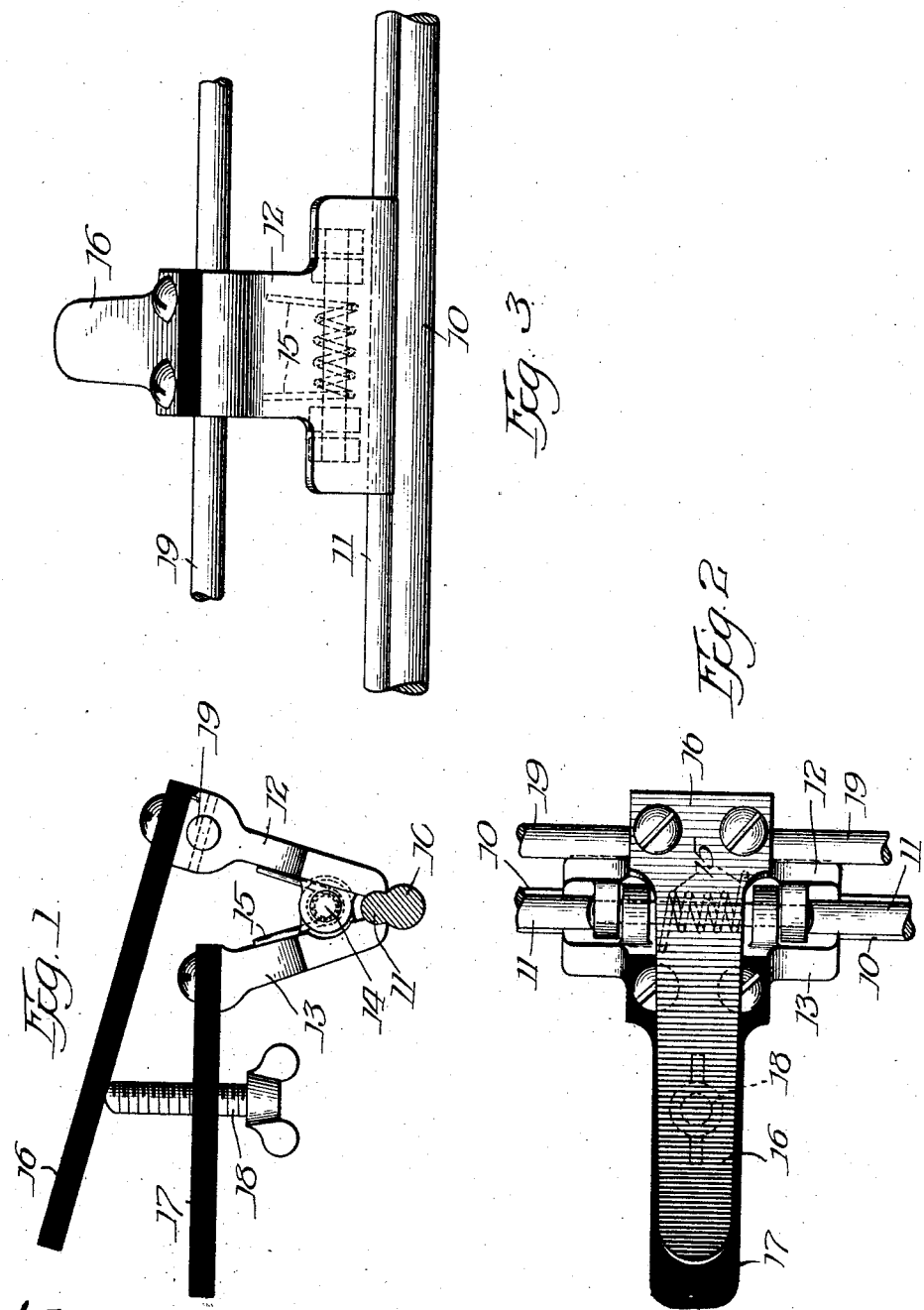

THOMAS G. FEAR, OF BAYVIEW, ALABAMA.

MINING-MACHINE CABLE-CONNECTOR.

1,210,445. Specification of Letters Patent. Patented Jan. 2, 1917.

Application filed November 3, 1915. Serial No. 59,449.

*To all whom it may concern:*

Be it known that I, THOMAS G. FEAR, a citizen of the United States, and resident of Bayview, in the county of Jefferson and State of Alabama, have invented certain new and useful Improvements in Mining-Machine Cable-Connectors, of which the following is a specification.

My invention relates to conductor cable clamps and has particular reference to the details of a novel clamp particularly adapted for use in connection with mining machines.

In many mines the cars are moved from place to place by electrical means, a trolley and trolley wire being commonly employed for transmitting the electrical energy to the motor. In such mines, it is common, likewise, to employ electrically operated mining machines. These machines are movable, *i. e.*, they travel as they cut their way into the seam or vein, and means must be provided for conducting the power necessary for the operation of the machine. It has been the practice to utilize the energy present in the trolley wire, a connector of some sort being attached to the trolley wire. In the devices heretofore employed, however, the means of connection to the trolley wire have interfered with the natural usage of the wire, requiring that the trolley be disengaged when passing over the point of connection to the mining machine.

I have devised a simple clamp by means of which the mining machine may be connected to the trolley wire at any desired point without interference with the operation of the cars or the trolley.

The clamp of my invention is for the purpose of attaching temporarily to a trolley wire a conductor cable which is connected to a mining machine of the portable type and which is used at several places during the operation of mining. In many mines the drills, etc., are operated by electricity and are moved from place to place as the work progresses. To equip the mines with a sufficient number of wires to operate every one of these machines is not practical. Inasmuch as in most of the mines the cars are operated by electricity, the use of the trolley wire as a source of power is the most logical. In the past it has been the custom to splice or otherwise fasten a conductor cable to a trolley wire, which fastening resulted in an uneven connection with the trolley wire, which threw off the trolley pole from engagement with the wire as the mine cars passed along. To obviate this I devised the clamp herein described. This clamp carries a conductor cable which is connected to or may be connected to a mining machine and is arranged in such manner as to clamp the trolley wire without interfering with the trolley pole. Also, the clamp may be removed from the wire and clamped thereto at any convenient point. Because of the insulated handles it is possible to operate this clamp without in any way endangering the operator from shock.

The device will be more readily understood by reference to the accompanying drawing, wherein—

Figure 1 is a side elevation of a clamp such as contemplated by me; Fig. 2 is a plan view of the same, and Fig. 3 is an end view.

In the construction shown the trolley wire is indicated at 10 and is provided, as is common in wires of this sort, with a side extension 11, the wire being in the form of a figure 8 in outline. The clamp may include jaws 12, 13, pivoted at 14 and normally held in clamping engagement by means of a spring 15. The jaws are intended to be operated by means of the handles 16, 17, connected to the jaws 12, 13 respectively, these handles being formed preferably of non-conducting material. Threaded into one of the handles is a thumb screw 18, by means of which the handles are positively separated and held in positive clamping position when once located. A further function of the thumb screw is in that it acts as a safety stop when the handles 16, 17 are brought closer together, it being understood that the thumb screw is retracted to permit disengagement of the clamp from the wire.

The terminal, or conductor, by means of which the current is communicated to the mining machine, may be in the form of the rod 19, rigidly secured to the jaw 12.

By the use of the construction shown a cheap, simple, efficient and safe connecting device is provided.

Obviously modifications may be made in the construction shown, and such modifications as are within the scope of my claims I consider within the spirit of my invention.

I claim:

1. A conductor cable connector clamp comprising a pair of jaws pivoted intermediate their ends, handles for operating said jaws, said handles being constructed of non-conducting material, the conductor being connected to one of said jaws and combined resilient and positive means for maintaining said jaws in clamping engagement, substantially as described.

2. A conductor cable connector clamp comprising a pair of jaws, a spring for holding said jaws in clamping engagement with a wire, a conductor connected to said jaws, a pair of insulated handles and a set screw for spreading said handles and positively holding said jaws in clamping engagement, substantially as described.

3. In a conductor cable connector clamp, the combination with a wire of jaws pivoted intermediate their ends, the clamp adapted to adjustably engage said wire, a conductor connected to one of said jaws, a spring tending to hold said jaws in clamping engagement with said wire, a pair of handles of non-conducting material, a set screw operating to spread said handles apart and positively hold said jaws in clamping engagement with said wire.

4. In a device of the class described, the combination with a trolley wire of a slidably and removably adjustable conductor connector clamp, the clamp comprising a pair of jaws pivoted intermediate their ends, a conductor connected to one of said jaws, a spring tending to hold said jaws in clamping engagement with said wire, a pair of handles of non-conducting material, a set-screw operating to spread said handles apart and positively hold said jaws in clamping engagement with said wire, substantially as described.

5. In a device of the class described, the combination with a trolley wire of a clamp adapted for removable engagement therewith, said clamp comprising a pair of jaws pivoted intermediate their ends, handles for operating said jaws, said handles being constructed of non-conducting material, a spring tending to hold said jaws in engagement with said wire, and positive means for spreading said handles and holding said jaws in positive clamping engagement with said wire, substantially as described.

Signed at Birmingham, Alabama, this 28th day of October, 1915.

THOMAS G. FEAR.

Witnesses:
MARY W. CRAVEN,
PEARLE DILLON.